(No Model.)

I. N. MATLICK.
HAY ELEVATOR, CONVEYER, AND STACKER.

No. 310,952. Patented Jan. 20, 1885.

WITNESSES
Wilmer Bradford
Joseph Cooney

INVENTOR
Isaac N. Matlick
By C. W. M. Smith
Attorney

UNITED STATES PATENT OFFICE.

ISAAC N. MATLICK, OF SAN JOSÉ, CALIFORNIA, ASSIGNOR OF ONE-HALF TO JOHN N. PRATHER, OF SAME PLACE.

HAY ELEVATOR, CONVEYER, AND STACKER.

SPECIFICATION forming part of Letters Patent No. 310,952, dated January 20, 1885.

Application filed June 18, 1884. (No model.)

*To all whom it may concern:*

Be it known that I, ISAAC N. MATLICK, a citizen of the United States, residing at San José, in the county of Santa Clara and State of California, have invented certain new and useful Improvements in Hay Stackers, Elevators, and Conveyers, of which the following is a specification.

The object of my invention is to provide an improved means whereby the hay, when gathered from the swath and deposited upon the pitcher-rack, may be easily and quickly raised up and carried to and deposited upon the location of the stack, which object I accomplish by means of the peculiar construction and novel arrangement of parts, as will be hereinafter more fully described.

Figure 1:
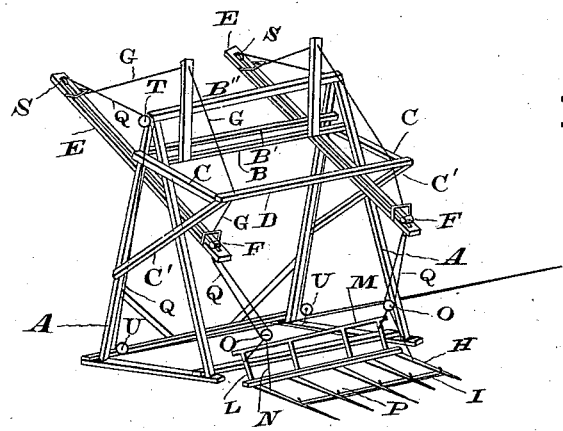
Figure 2:
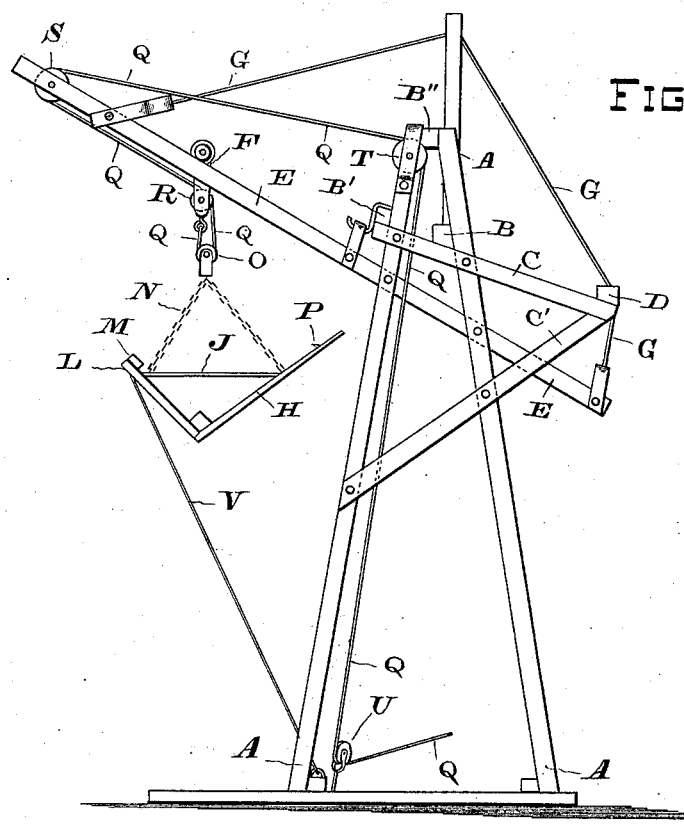

In the accompanying drawings, forming a part of this specification, Figure 1 is a perspective view of my improved hay-stacker. Fig. 2 is a side elevation of the same.

Similar letters of reference are used to indicate like parts throughout the several figures.

A A represent the supporting frame-work of my improved stacker. This frame-work is made rectangular in plan, and the uprights upon each side approach each other and are connected by the cross-braces B B' B''. The sides are braced by the timbers C and C', the outer ends of which are connected by the cross-brace D.

The carrier-frames E E are made of any desired length, and are adapted for the reception and carriage of the carriers F F. These carrier-frames are connected to the frame-work A A by means of suitable braces or loops, G G, as shown. The pitcher-rack is composed of a frame-work of long teeth, H H, braced together near their points by a transverse bar, I, and the side or end braces, J. (Seen only in Fig. 2.) From the rake-head bar K are extended the upwardly-projecting standards L, braced at the top by a transverse bar, M. Bail-chains N N are attached to each end of the pitcher, as shown, and are provided with pulleys O O. Backwardly-curved teeth or hooks P P are attached to the forward end of the teeth of the pitcher-rack, the object of which is to hold the deposited hay upon the rack while the teeth of the buck-rake are being withdrawn from beneath the load. Operating-ropes Q Q are attached to the carriers F F, and are then led down and rove through the pulleys O O upon the pitcher-rack, and from thence up and over the hanger-pulleys R R, and thence out forward and rove around the pulleys S S, secured within the rear end of the carrier-frames E E. They are then led backward and rove through the pulleys T T at the top of the main supporting-frame, and from thence downward and through the dock-blocks U U, secured to the base of the frame-work, and their bight or loose end is secured to a double or single tree for draft purposes. A tripping-rope, V, is attached to the rear of the pitcher-rack, and its opposite end is secured to any fixed portion of the main framing.

In practice the hay is first deposited upon the pitcher as it lies upon the ground at the foot of the stacker. As the hoisting-ropes are drawn upon, the pitcher and load are raised vertically until the pulley-block of the pitcher strikes against the hanger, when the said hanger, carrier, and pitcher will then all be drawn up the inclined track-frames toward the rear or dump end thereof. As the pitcher-frame approaches the end of its travel, the tripping-rope V is drawn taut, and the further forward progress of the pitcher is arrested; but as the pull upon the hoisting-ropes is continued the rear portion of the pitcher will be drawn forward and upward, thus tilting the pitcher and throwing out or dumping the load of hay upon the stack. The pitcher may now be drawn back by the tripping-rope or allowed to descend by its own weight back to its original position.

It should here be remarked that the pitching-frame may be dispensed with, and a net or fork substituted in lieu thereof.

Having thus described my invention, what I claim, and desire to secure by Letters Patent, is—

1. In a hay-stacker, the supporting-frame A, having two parallel carrier-frames, E, and carrier F, operated by a system of pulleys and ropes, substantially as shown, for the purpose set forth.

2. In a hay-stacker, the combination of the pitcher-frame herein described, consisting of a series of parallel teeth, H, connecting bars or braces I, J, and K, standard L, connecting-bar M, detaining prongs or teeth P, and bail-chains and pulleys N O, substantially as shown and set forth.

3. The double carrier-frame E E, supported by a suitable frame-work, A, and having the pulleys S S, carriers F F, and a pitcher-frame operated by pulleys and ropes, substantially as shown and set forth.

In testimony that I claim the foregoing I have hereunto set my hand and seal.

ISAAC N. MATLICK. [L. S.]

Witnesses:
WILMER BRADFORD,
CHAS. E. KELLY.